United States Patent
Konishi et al.

(10) Patent No.: US 10,665,105 B2
(45) Date of Patent: May 26, 2020

(54) DYNAMIC-MAP CONSTRUCTING METHOD, DYNAMIC-MAP CONSTRUCTING SYSTEM, AND MOVING TERMINAL

(71) Applicant: Panasonic Intellectual Property Corporation of America, Torrance, CA (US)

(72) Inventors: Kazunobu Konishi, Osaka (JP); Eiichi Muramoto, Kanagawa (JP); Takahiro Yoneda, Osaka (JP); Ryota Ohnishi, Hyogo (JP); Yuta Shimotsuma, Osaka (JP)

(73) Assignee: PANASONIC INTELLECTUAL PROPERTY CORPORATION OF AMERICA, Torrance, CA (US)

(*) Notice: Subject to any disclaimer, the term of this patent is extended or adjusted under 35 U.S.C. 154(b) by 231 days.

(21) Appl. No.: 15/667,875

(22) Filed: Aug. 3, 2017

(65) Prior Publication Data
US 2018/0047291 A1    Feb. 15, 2018

(30) Foreign Application Priority Data
Aug. 10, 2016  (JP) .................................. 2016-158069

(51) Int. Cl.
*G08G 1/16* (2006.01)
*G08G 1/01* (2006.01)
(Continued)

(52) U.S. Cl.
CPC .............. *G08G 1/166* (2013.01); *G01C 21/32* (2013.01); *G08G 1/0112* (2013.01);
(Continued)

(58) Field of Classification Search
None
See application file for complete search history.

(56) References Cited

U.S. PATENT DOCUMENTS

| 9,230,441 B2* | 1/2016 | Sung ...................... G08G 1/166 |
| 2012/0136510 A1* | 5/2012 | Min ........................ G01S 17/88 |
| | | 701/2 |

(Continued)

FOREIGN PATENT DOCUMENTS

| JP | 2006-048199 A | 2/2006 |
| JP | 2006-115360 | 4/2006 |

(Continued)

*Primary Examiner* — Christian Chace
*Assistant Examiner* — Kyung J Kim
(74) *Attorney, Agent, or Firm* — Greenblum & Bernstein, P.L.C.

(57) ABSTRACT

A roadside device transmits first detection data obtained by a first sensor to a server. The server extracts an unobservable area that is a blind spot of the first sensor, based on the first detection data, and transmits unobservable-area information indicating the unobservable area to a moving terminal. The moving terminal extracts, based on second detection data obtained by a second sensor, second dynamic information indicating an object that exists in a sensing range of the second sensor, and determines whether or not an overlapping area where the unobservable area indicated by the unobservable-area information and the sensing range of the second sensor overlap each other exists. Upon determining that the overlapping area exists, the moving terminal transmits, to the server, third dynamic information that is included in the second dynamic information and that indicates an object that exists in the overlapping area.

7 Claims, 12 Drawing Sheets

(51) Int. Cl.
*G08G 1/13* (2006.01)
*G01C 21/32* (2006.01)

(52) U.S. Cl.
CPC ......... *G08G 1/0116* (2013.01); *G08G 1/0145* (2013.01); *G08G 1/13* (2013.01)

(56) References Cited

U.S. PATENT DOCUMENTS

| | | | | |
|---|---|---|---|---|
| 2012/0191331 A1* | 7/2012 | Torres | ................ | G08G 5/0013 |
| | | | | 701/120 |
| 2015/0365632 A1* | 12/2015 | Eilertsen | ................ | G08G 1/164 |
| | | | | 348/149 |
| 2017/0023945 A1* | 1/2017 | Cavalcanti | ........... | G08G 1/0116 |

FOREIGN PATENT DOCUMENTS

| | | |
|---|---|---|
| JP | 2008-294740 | 12/2008 |
| JP | 2008-299676 A | 12/2008 |

* cited by examiner

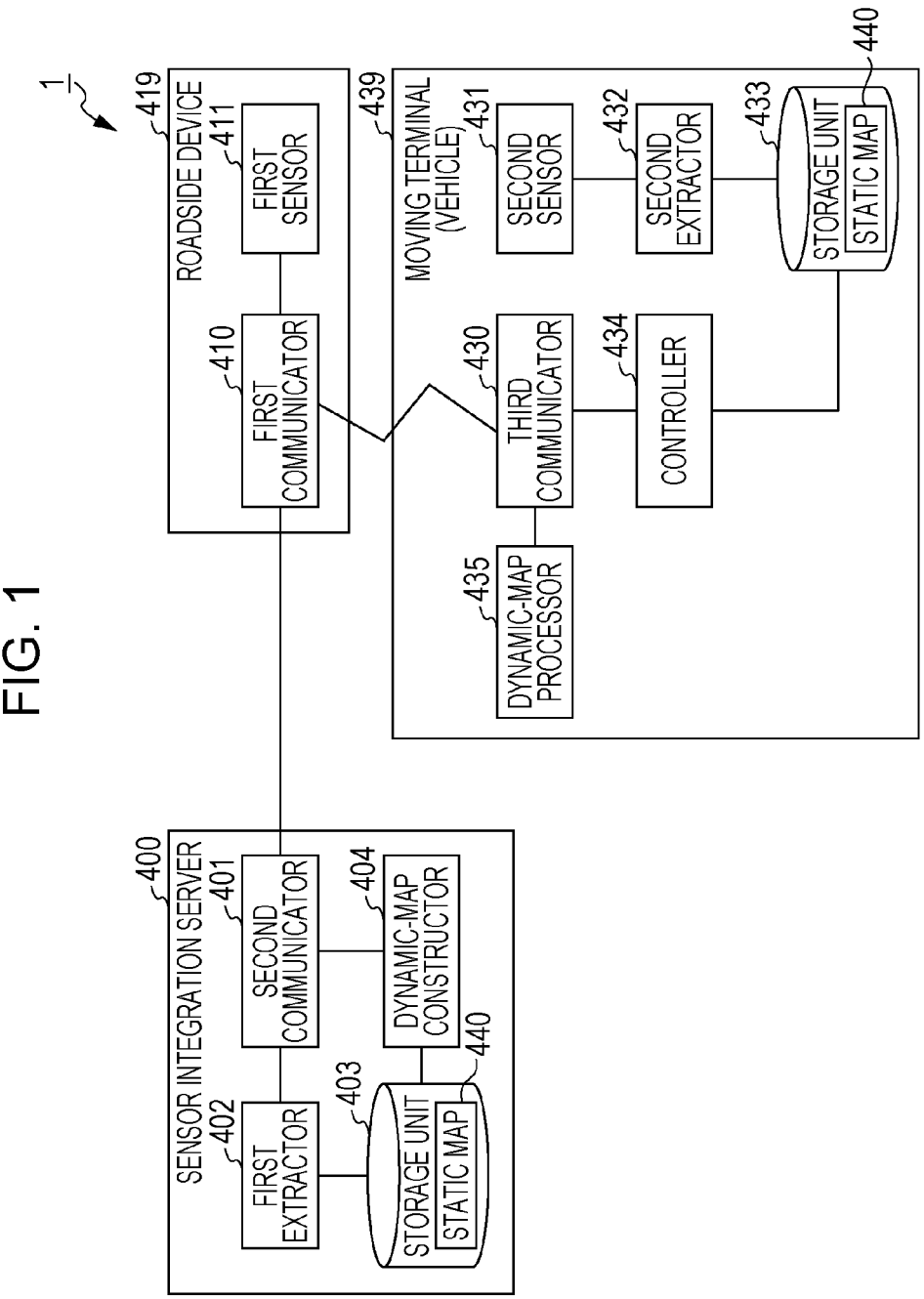

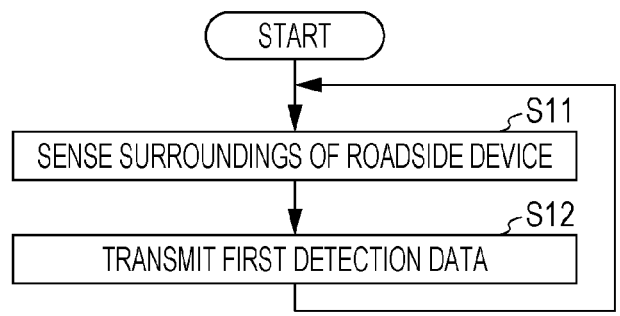
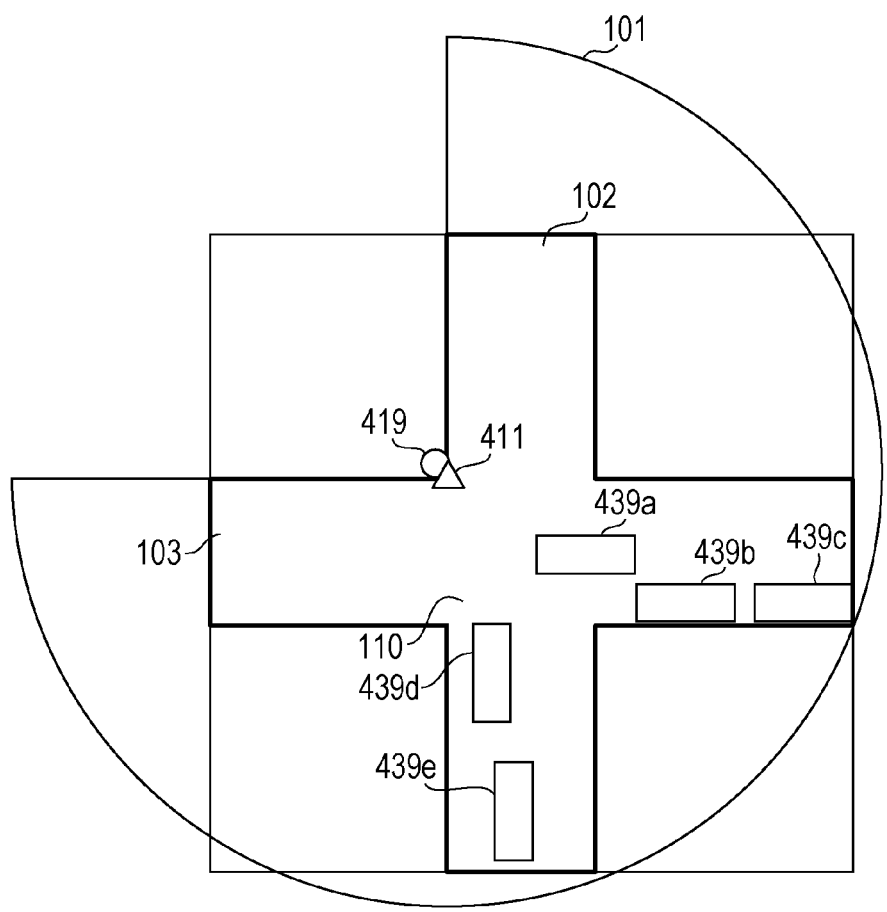

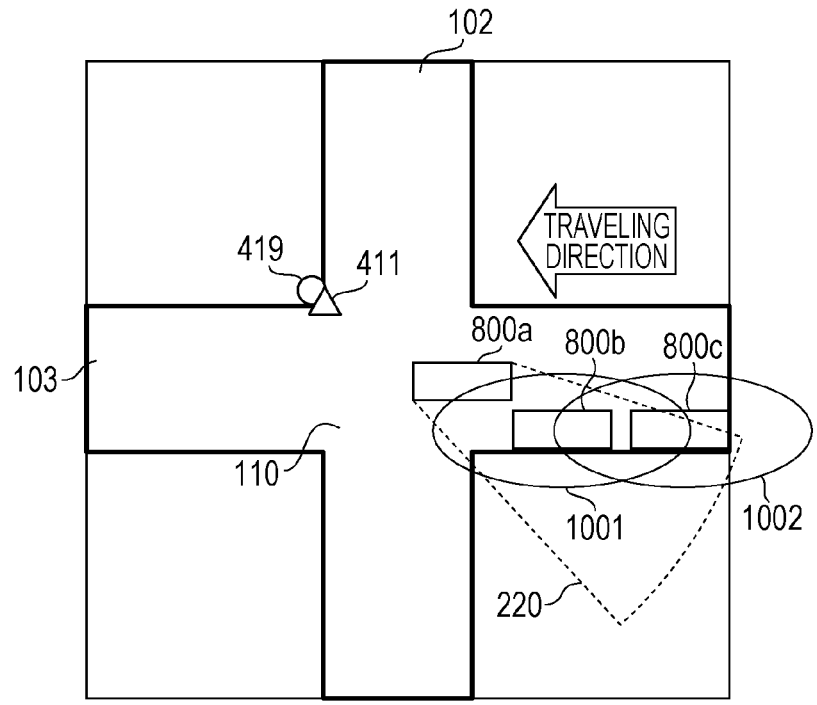
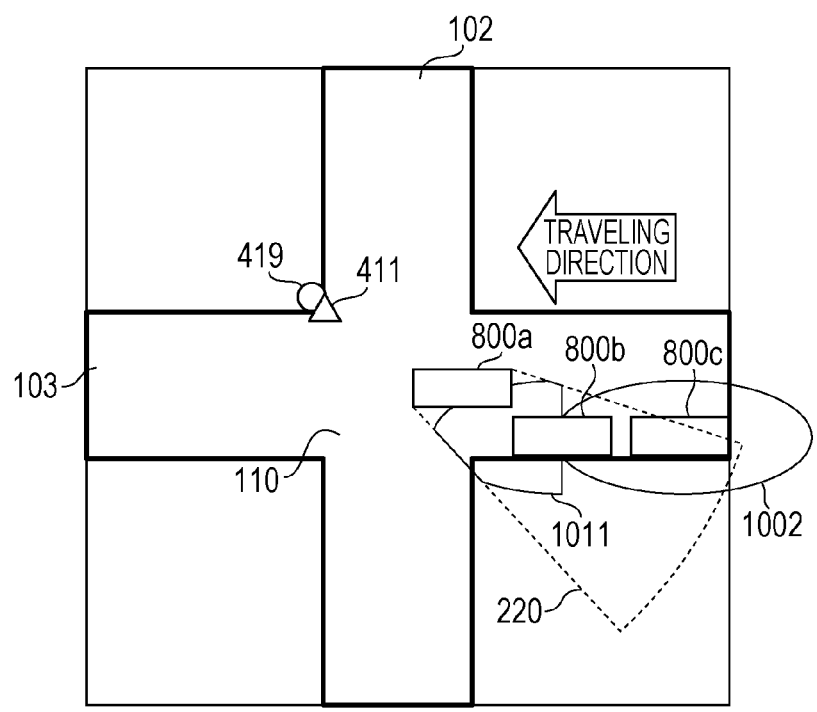

DYNAMIC-MAP CONSTRUCTING METHOD, DYNAMIC-MAP CONSTRUCTING SYSTEM, AND MOVING TERMINAL

BACKGROUND

1. Technical Field

The present disclosure relates to a dynamic-map constructing method for constructing a dynamic map in which areas on a static map and dynamic information indicating objects, such as vehicles, people, or the like, that exist at actual places corresponding to the areas are associated with each other, a dynamic-map constructing system for constructing the dynamic map, and a moving terminal.

2. Description of the Related Art

Recent years have seen advances in development of technology for aiding safe driving and technology for realizing automatic driving. In the development of the technologies, a dynamic map has been proposed for a moving terminal (vehicle) to recognize dynamic information about the position and the moving speed of a vehicle, person, bicycle, or the like in the surroundings of the moving terminal, the state of a traffic light, and so on. The dynamic map is, for example, a map in which the dynamic information in the surroundings of a roadside device, a vehicle, or the like, the dynamic information being obtained from a sensor, such as a laser rangefinder or a millimeter-wave sensor, included in the roadside device, the vehicle, or the like is superimposed on a static map including static information about buildings and roads.

By using the dynamic map, the vehicle can accurately recognize the surrounding situation that changes by the moment according to movement of the vehicle or movement of another vehicle, a bicycle, or the like in the surroundings, can perform control corresponding to the surrounding situation, and can visualize the surrounding situation and transmit, for example, dynamic information about the surroundings to the driver.

The dynamic map can also include information in a large range, depending on sensor information from sensors placed at a plurality of places, the sensor information being collected, for example, through communication between vehicles and roadside devices (i.e., through vehicle-road communication). This allows each vehicle to recognize dynamic information in a range that cannot be recognized by using only sensors included in the vehicle. For example, when the vehicle enters a place with poor visibility, such as an intersection, the vehicle can pre-recognize the position of another vehicle, a person, or the like that is present at the place with poor visibility and can perform speed adjustment and wheel control for safety with an enough margin. Thus, the dynamic map that allows for recognition of a range that cannot be recognized by sensors included in one vehicle potentially has various possibilities of reducing traffic accidents, increasing traffic efficiency, and so on.

As a dynamic-map constructing method for constructing such a dynamic map, there has been proposed a method regarding collection and delivery of sensor information of vehicles and a roadside device.

For example, Japanese Patent No. 4798383 (hereinafter referred to as "Patent Document 1") discloses a method for reliably delivering, to a predetermined vehicle, sensor information collected by vehicles and roadside devices. More specifically, Patent Document 1 discloses a method in which the roadside devices recognize the positions of the vehicles and determine, in accordance with the recognized positions of the vehicles, communication paths for delivering the sensor information collected by the vehicles and the roadside devices.

Also, Japanese Patent No. 4627171 (hereinafter referred to as "Patent Document 2") discloses a method in which a first vehicle issues a request for an image of a predetermined range to a second vehicle, and the second vehicle that received the request clips the image of the predetermined range from an image that the second vehicle has, and transfers the clipped image to the first vehicle that issued the request. More specifically, Patent Document 2 discloses a method in which an image to be communicated is limited to thereby reduce a band used in a network.

In Patent Document 1, however, the sensor information that is collected also includes unwanted information, and no consideration is given to efficient information collection.

In Patent Document 2, when a large number of vehicles exist in a certain range, all of the vehicles issue requests for images of ranges needed for the respective vehicles.

Thus, in the methods disclosed in Patent Documents 1 and 2, for example, the overall amount of communication between the roadside devices and the vehicles increases, thus the network bandwidth becomes insufficient

SUMMARY

One non-limiting and exemplary embodiment provides a dynamic-map constructing method, a dynamic-map constructing system, and a moving terminal that can suppress a shortage of a network band.

In one general aspect, the techniques disclosed here feature a method used in a system including a roadside device having a first sensor that observes surroundings of the roadside device, a moving terminal having a second sensor that observes surroundings of the moving terminal, and a server. The method includes: the roadside device transmitting first detection data in a sensing range of the first sensor to the server, the first detection data being obtained by the first sensor; the server receiving the first detection data and extracting, based on the received first detection data, first dynamic information indicating a first object that exists in the sensing range of the first sensor and an unobservable area that is a blind spot of the first sensor, the blind spot being caused by the first object; the server transmitting unobservable-area information indicating the unobservable area to the moving terminal; the moving terminal extracting second dynamic information indicating a second object that exists in a sensing range of the second sensor, based on second detection data in the sensing range of the second sensor, the second detection data being obtained by the second sensor; the moving terminal receiving the unobservable-area information and determining whether or not an overlapping area where the unobservable area indicated by the unobservable-area information and the sensing range of the second sensor overlap each other exists; and the moving terminal transmitting third dynamic information to the server upon determining that the overlapping area exists, the third dynamic information being included in the second dynamic information and indicating an object that exists in the overlapping area.

The dynamic-map constructing method, the dynamic-map constructing system, and the moving terminal according to the present disclosure can suppress a shortage of a network band.

It should be noted that general or specific embodiments may be implemented as a system, an apparatus, a device, a method, a storage medium, a computer program, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 1 is a block diagram illustrating one example of the configuration of a dynamic-map constructing system according to a first embodiment;

FIG. 2 is a flowchart illustrating one example of an operation when a roadside device according to the first embodiment performs sensing;

FIG. 3 is a diagram illustrating one example of a sensing range of a first sensor according to the first embodiment;

FIG. 15 is a diagram illustrating a sensing range of the second sensor according to the second embodiment;

FIG. 16 is a diagram for describing fourth dynamic information;

DETAILED DESCRIPTION

Figure 4:
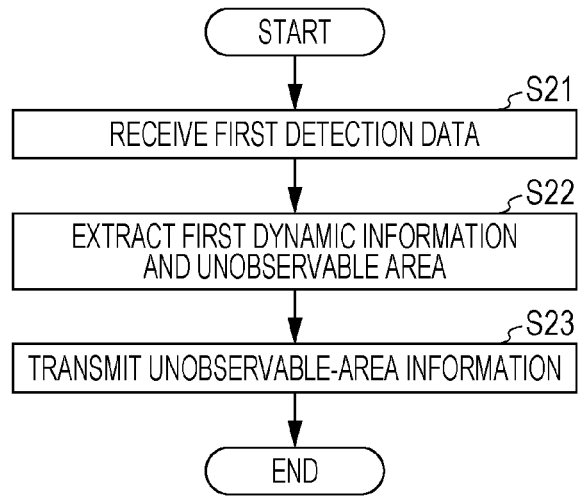
FIG. 4 is a flowchart illustrating one example of an operation when a sensor integration server according to the first embodiment receives first detection data.

A method according to the present disclosure is directed to a method used in a system including a roadside device having a first sensor that observes surroundings of the roadside device, a moving terminal having a second sensor that observes surroundings of the moving terminal, and a server. The method includes: the roadside device transmitting first detection data in a sensing range of the first sensor to the server, the first detection data being obtained by the first sensor; the server receiving the first detection data and extracting, based on the received first detection data, first dynamic information indicating a first object that exists in the sensing range of the first sensor and an unobservable area that is a blind spot of the first sensor, the blind spot being caused by the first object; the server transmitting unobservable-area information indicating the unobservable area to the moving terminal; the moving terminal extracting second dynamic information indicating a second object that exists in a sensing range of the second sensor, based on second detection data in the sensing range of the second sensor, the second detection data being obtained by the second sensor; the moving terminal receiving the unobservable-area information and determining whether or not an overlapping area where the unobservable area indicated by the unobservable-area information and the sensing range of the second sensor overlap each other exists; and the moving terminal transmitting third dynamic information to the server upon determining that the overlapping area exists, the third dynamic information being included in the second dynamic information and indicating an object that exists in the overlapping area.

With this arrangement, when the overlapping area where the unobservable area and the sensing range of the second sensor overlap each other does not exist, that is, when the server already recognizes all dynamic information in the sensing range, the moving terminal does not transmit, to the server, the second dynamic information indicating an object that exists in the sensing range. Also, when the overlapping area exists, that is, when the server does not recognize part of the dynamic information in the sensing range, the moving terminal transmits, to the server, the third dynamic information that indicates an object that exists in the overlapping area and whose amount of information is smaller than or equal to the second dynamic information. Thus, the amount of information in communication between the server and the moving terminal (or between the roadside device and the moving terminal when the roadside device relays a communication between the server and the moving terminal), and thus it is possible to suppress a shortage of the network band.

Upon determining that the overlapping area exists, the moving terminal may further transmit observation-area information indicating the sensing range of the second sensor to the server.

When the overlapping area exists, and only the third dynamic information is transmitted, the server can recognize an area that is included in the overlapping area and where the object indicated by the third dynamic information exists, but cannot recognize whether or not an object exists in an area that is included in the overlapping area and that is not the area where the object exists. Also, when an overlapping area exists and no object exists in the overlapping area, the server cannot recognize whether or not the object exists in the overlapping area, unless the third dynamic information is transmitted. In contrast, in this aspect, when an overlapping area exists, the moving terminal transmits, to the server, observation-area information indicating the sensing range of the second sensor. Accordingly, upon receiving the third dynamic information and the observation-area information, the server can recognize that no object exists in an area except the area where the object that exists in the overlapping area and that is indicated by the third dynamic information. Also, for example, upon receiving only the observation-area information of the third dynamic information and the observation-area information, the server can recognize that no object exists in the overlapping area. As described above, the server can recognize that no object exists in an area that the roadside device failed to observe and can further reduce the unobservable area.

Upon receiving the third dynamic information, the server may construct a dynamic map by associating the extracted first dynamic information and the received third dynamic information with a static map.

This makes it possible to construct a dynamic map, while suppressing a shortage of the network band. Then, when one moving terminal receives the dynamic map, the moving terminal can perform, for example, control for safety.

When the moving terminal determines that the overlapping area exists, and the second dynamic information includes information indicating another moving terminal that exists behind relative to a traveling direction of the moving terminal, the moving terminal may transmit fourth dynamic information to the server, the fourth dynamic information being included in the third dynamic information and indicating an object that exists ahead relative to the traveling direction.

When an area where the sensing ranges of the second sensors included in a plurality of moving terminals overlap each other exists, and each of the moving terminals transmits dynamic information found in the overlapping area, pieces of dynamic information that are identical to each other are transmitted, thus consuming the network band. In contrast, in this aspect, when the moving terminals recognizes that another moving terminal exists behind relative to the traveling direction of the moving terminal, the moving terminal transmits, to the server, the fourth dynamic information indicating an object that exists ahead in the traveling direction, in order to prevent the plurality of moving terminals from transmitting pieces of information that are identical to each other. Accordingly, pieces of information that are identical to each other are less likely to be transmitted, thus making it possible to further suppress a shortage of the network band.

Also, when changing the movement path of the moving terminal increases the overlapping area, the moving terminal may change the movement path.

This makes it possible to further reduce the unobservable area.

A system according to the present disclosure includes a moving terminal, a roadside device, and a server. The roadside device includes a first sensor that observes surroundings of the roadside device to obtain first detection data in a sensing range of the first sensor, and a first communicator that transmits the first detection data to the server. The server includes a second communicator that receives the first detection data, and a first extractor that extracts, based on the received first detection data, first dynamic information indicating a first object that exists in the sensing range of the first sensor and an unobservable area that is a blind spot of the first sensor, the blind spot being caused by the first object. The server transmits unobservable-area information indicating the extracted unobservable area to the moving terminal. The moving terminal includes a third communicator that receives the unobservable-area information, a second sensor that observes surroundings of the moving terminal to obtain second detection data in a sensing range of the second sensor, a second extractor that extracts second dynamic information indicating a second object that exists in the sensing range of the second sensor, based on the second detection data, and a controller that determines whether or not an overlapping area where the unobservable area indicated by the received unobservable-area information and the sensing range of the second sensor overlap each other exists. Upon determining that the overlapping area exists, the third communicator transmits third dynamic information to the server, the third dynamic information being included in the second dynamic information and indicating an object that exists in the overlapping area.

This makes it possible to provide a dynamic-map constructing system that can suppress a shortage of the network band.

A moving terminal according to the present disclosure is directed to a moving terminal used in a system including the moving terminal, a roadside device having a first sensor that observes surroundings of the roadside device, and a server. The moving terminal includes: a communicator that receives unobservable-area information indicating an unobservable area that is a blind spot of the first sensor, the blind spot being caused by a first object that exists in a sensing range of the first sensor; a second sensor that observes surroundings of the moving terminal; an extractor that extracts dynamic information indicating a second object that exists in a sensing range of the second sensor, based on detection data in the sensing range of the second sensor; and a controller that determines whether or not an overlapping area where the unobservable area indicated by the unobservable-area information and the sensing range of the second sensor overlap each other exists. When the controller determines that the overlapping area exists, the communicator transmits dynamic information to the server, the dynamic information being included in the dynamic information extracted by the extractor and indicating an object that exists in the overlapping area.

This makes it possible to provide a moving terminal that can suppress a shortage of the network bandwidth.

Embodiments will be described below in detail with reference to the accompanying drawings.

The embodiments described below all represent general or specific examples. Numerical values, shapes, constituent elements, the arrangement positions and connection forms of constituent elements, steps, the order of steps, and so on described in the embodiments below are examples and are not intended to limit the present disclosure. Of the constituent elements in the embodiments described below, constituent elements not set forth in the independent claims that represent the broadest concept will be described as optional constituent elements.

First, a first embodiment will be described with reference to FIGS. 1 to 12.

First Embodiment

[1.1 Configuration of Dynamic-Map Constructing System]

FIG. 1 is a block diagram illustrating one example of the configuration of a dynamic-map constructing system 1 according to the first embodiment.

The dynamic-map constructing system 1 is a system that constructs an integrated dynamic map in which areas on a static map and information indicating objects that exist at actual places corresponding to the areas are associated with each other. The static map is a map including static information whose positions do not vary on a long-term basis. Examples include buildings, roads, and traffic lights. Also, examples of the objects that exist at actual places include position-varying moving objects, such vehicles, people, or bicycles, or non-moving objects, such as standing signs that are temporarily placed. Information indicating presences of such objects is referred to as "dynamic information". Moving terminals, such as vehicles, can recognize actual road situations and so on by using the dynamic map constructed by the dynamic-map constructing system 1 and can perform, for example, control for safety, automatic driving, or the like.

The dynamic-map constructing system 1 includes a sensor integration server 400, a roadside device 419, and at least one moving terminal 439. In the dynamic-map constructing system 1, the sensor integration server 400 communicates with at least one moving terminal 439 and the roadside device 419 and construct the dynamic map by associating dynamic information with a static map through use of information obtained by sensors included in the at least one moving terminal 439 and the roadside device 419.

The sensor integration server 400 is a server that constructs the dynamic map by integrating information collected from each moving terminal 439 and the roadside device 419. The sensor integration server 400 includes a second communicator 401, a first extractor 402, a storage unit 403, and a dynamic-map constructor 404.

The second communicator 401 is a communication interface that communicates with a first communicator 410 included in the roadside device 419 (described below). The second communicator 401 and the first communicator 410 may communicate with each other in a wired or wireless manner. The second communicator 401 also communicates with a third communicator 430 included in each moving terminal 439 (described below) through the first communicator 410. The second communicator 401 may directly communicate with the third communicator 430.

Based on first detection data (described below) received from the roadside device 419, the first extractor 402 extracts first dynamic information and an unobservable area (which are described below). The operation of the first extractor 402 is described later in detail with reference to FIG. 4.

The storage unit 403 is a storage device in which information, such as dynamic information and a static map 440, extracted by the first extractor 402 is stored. The storage unit 403 is realized by, for example, a read-only memory (ROM) or a random-access memory (RAM).

The dynamic-map constructor 404 constructs an integrated dynamic map by using information obtained from each moving terminal 439 and the roadside device 419. The operation of the dynamic-map constructor 404 is described later in detail with reference to FIG. 12.

Control on the first extractor 402, the dynamic-map constructor 404, and the communication of the second communicator 401 is implemented by, for example, a processor for executing a control program stored in the storage unit 403 or may be implemented by a microcomputer, a dedicated circuit, or the like.

The roadside device 419 is a traffic light, a roadside mirror, or the like installed at the side of a road or the like and includes the first communicator 410 and a first sensor 411. The roadside device 419 may be a pole that does not have the function of a traffic light or roadside mirror.

The first communicator 410 is a communication interface that communicates with the second communicator 401 and the third communicator 430. The first communicator 410 and the third communicator 430 communicate with each other, for example, in a wireless manner. The first communicator 410 also transfers, for example, information, obtained from the second communicator 401, to the third communicator 430 and transfers information, obtained from the third communicator 430, to the first communicator 410.

The first sensor 411 is a sensor for observing surroundings of the roadside device 419. The first sensor 411 may be any sensor that can obtain the first detection data. Examples of the first sensor 411 include a millimeter-wave sensor using radio waves in a high-frequency band, a laser rangefinder using laser light, a camera serving as an image sensor, an ultrasonic sensor using ultrasonic waves, or a combination thereof. In the present embodiment, the first sensor 411 is assumed to be a laser rangefinder, by way of example. The first sensor 411 obtains the first detection data in the sensing range of the first sensor 411. The first detection data is described later in detail with reference to FIGS. 2 and 3.

Control on the communication of the second communicator 401 and control on sensing of the first sensor 411 are implemented by, for example, a processor for executing a control program stored in a storage unit (not illustrated) included in the roadside device 419 or may be implemented by a microcomputer, a dedicated circuit, or the like.

Each moving terminal 439 is a vehicle or a portable terminal carried by a person. Examples of the portable terminal include a smartphone and a tablet terminal. In the present embodiment, the moving terminal 439 is a vehicle, by way of example. The moving terminal 439 includes the third communicator 430, a second sensor 431, a second extractor 432, a storage unit 433, a controller 434, and a dynamic-map processor 435.

The third communicator 430 is a communication interface that communicates with the first communicator 410. The third communicator 430 also communicates with the second communicator 401 via the first communicator 410. The third communicator 430 and the second communicator 401 may directly communicate with each other.

The second sensor 431 is a sensor for observing surroundings of the moving terminal 439. Similarly, to the first sensor 411, the second sensor 431 may be a laser rangefinder, a millimeter-wave sensor, an ultrasonic sensor, an image sensor, or a combination thereof. In the present embodiment, the second sensor 431 is assumed to be a laser rangefinder, by way of example. The second sensor 431 obtains second detection data in the sensing range of the second sensor 431. The second detection data is described later in detail with reference to FIGS. 6 and 7.

Based on information obtained by the second sensor 431, the second extractor 432 extracts second dynamic information (described below). The operation of the second extractor 432 is described later in detail with reference to FIGS. 6 and 7.

The storage unit 433 is a storage device in which information, such as dynamic information and a static map 440, extracted by the second extractor 432 is stored. For example, the static map 440 stored in the storage unit 433 is the same as the static map 440 stored in the storage unit 403 included in the sensor integration server 400. For example, when the static map 440 stored in the storage unit 403 is updated, the updated static map 440 is delivered to each moving terminal 439, and the static map 440 stored in the corresponding storage unit 433 is also updated. The storage unit 433 is implemented by, for example, a ROM or a RAM.

The controller 434 determines whether or not an overlapping area where an unobservable area indicated by unobservable-area information received by the third communicator 430 and the sensing range of the second sensor 431 overlap each other exists. The operation of the controller 434 is described later in detail with reference to FIG. 8.

The dynamic-map processor 435 controls actions of the moving terminal 439, based on the dynamic map constructed by the sensor integration server 400. The dynamic-map processor 435 performs, for example, control for safety of the moving terminal 439.

Control on the second extractor 432, the controller 434, the dynamic-map processor 435, and the communication of the third communicator 430 and control on sensing of the second sensor 431 are implemented by, for example, a processor for executing a control program stored in the storage unit 433 or may be implemented by a microcomputer, a dedicated circuit, or the like.

[1.2 Operation of Dynamic-Map Constructing System]

Next, the operation of the dynamic-map constructing system 1 will be described with reference to FIGS. 2 to 12.

An operation when the roadside device 419 performs sensing using the first sensor 411 will first be described with reference to FIGS. 2 and 3.

FIG. 2 is a flowchart illustrating one example of an operation when the roadside device 419 according to the first embodiment performs sensing.

FIG. 3 is a diagram illustrating one example of a sensing range of the first sensor 411 according to the first embodiment.

First, the first sensor 411 senses surroundings of the roadside device 419 (step S11). FIG. 3 illustrates a sensing range 101 of the first sensor 411. The roadside device 419 is installed in the vicinity of an intersection 110 at which roads 102 and 103 intersect each other. In addition, in FIG. 3, vehicles 439a to 439e that are traveling in the vicinity of the intersection 110 are depicted as a situation of the roads 102 and 103 in the vicinity of the intersection 110 at a moment. In the present embodiment, the vehicles 439a to 439e may be collectively referred to as "moving terminals 439". The first sensor 411, which is a laser rangefinder, emits laser light, such as infrared laser light, to the sensing range 101 illustrated in FIG. 3. The first sensor 411 has, for example, a mechanism for horizontally rotating the first sensor 411, for example, about a pole that is a part of the roadside device 419. This makes it possible to scan laser light in the sensing range 101. As described above, the first sensor 411 obtains the first detection data for recognizing the presence of an object, such as a vehicle, person, or bicycle, that exists on the roads 102 and 103. The first detection data is, for example, point-group data indicating a plurality of points on an object illuminated with laser light when the first sensor 411 performs laser-scanning in the sensing range 101. Each piece of point data has, for example, information regarding a distance and a direction from the first sensor 411, when centered at the first sensor 411, in the sensing range 101, and information regarding coordinates indicating a height and so on. Thus, when the vehicles 439a to 439e exist in the sensing range 101, as illustrated in FIG. 3, the first sensor 411 obtains point-group data on the vehicles 439a to 439e as the first detection data, the point-group data allowing for recognition of the positions where the vehicles 439a to 439e exist.

Next, the first communicator 410 transmits the first detection data in the sensing range 101 of the first sensor 411, the first detection data being obtained by the first sensor 411, to the sensor integration server 400 (step S12).

Since the positions of objects that exist on the roads 102 and 103 change by the moment, the roadside device 419 repeatedly performs the processes in steps S11 and S12 at predetermined time intervals. For example, when 100 ms is taken until the laser scanning in the sensing range 101 in step S11 is completed, the first detection data is transmitted to the sensor integration server 400 at intervals of 100 ms. In such a manner, the above-described processes are repeated at predetermined time intervals according to hardware specifications of the first sensor 411.

Next, an operation when the sensor integration server 400 receives the first detection data from the roadside device 419 will be described with reference to FIGS. 4 and 5.

FIG. 4 is a flowchart illustrating one example of an operation when the sensor integration server 400 according to the first embodiment receives the first detection data.

Figure 5:
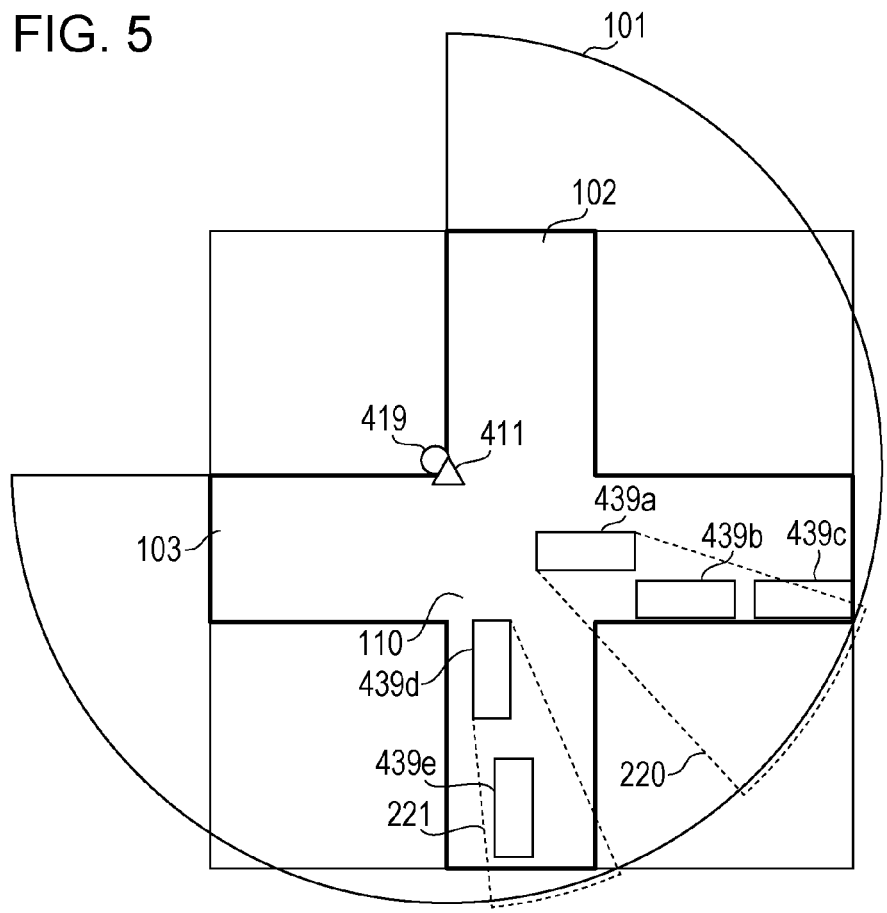
FIG. 5 is a diagram illustrating one example of an unobservable area, which is a blind spot of the first sensor according to the first embodiment.

FIG. 5 is a diagram illustrating one example of an unobservable area that is a blind spot of the first sensor 411 according to the first embodiment.

First, the second communicator 401 receives the first detection data transmitted by the first communicator 410 (step S21).

Next, based on the first detection data received by the second communicator 401, the first extractor 402 extracts first dynamic information indicating objects that exist in the sensing range 101 of the first sensor 411 and an unobservable area that is a blind spot of the first sensor 411 owing to the objects (step S22). Now, a description will be given of the first dynamic information and the unobservable area.

The first detection data is, for example, point-group data, as described above, Points that constitute the point-group data each have information regarding coordinates, centered at the first sensor 411, of a place where an object is illuminated with the laser light. That is, the first extractor 402 can recognize the distance and direction of each point from the first sensor 411, when centered at the first sensor 411, and the height of each point. Also, when the static map 440 is stored in the storage unit 403, and for example, coordinates on the static map 440 of the first sensor 411 are also stored, the coordinates centered at the first sensor 411 can be converted into the coordinates on the static map 440, and the positions of respective points can be mapped to the static map 440. As a result, an area in which points cannot be mapped to the static map 440 becomes an unobservable area.

The first extractor 402 recognizes what objects exist, for example, by applying machine learning to the first detection data received by the second communicator 401 and extracts, as the first dynamic information, the recognized objects that exist in the sensing range 101. For example, based on changes over time in position information included in the point-group data that is transmitted at predetermined time intervals, as described above, the first extractor 402 can recognize whether or not each object in question is a moving object, such as a vehicle, person, or bicycle, and whether or not the object is moving.

As illustrated in FIG. 5, the vehicles 439a to 439e are assumed to exist in the vicinity of the intersection 110. The first sensor 411 obtains the first detection data in the sensing range 101. However, when an object, such as a large vehicle, exists in the sensing range 101, the far side of the object when viewed from the first sensor 411 is a blind spot of the first sensor 411 owing to the object, and thus the first sensor 411 cannot observe the blind spot. Such a blind spot is an unobservable area, and specifically, the blind spot of the first sensor 411 owing to the vehicle 439a is an unobservable area 220, and the blind spot of the first sensor 411 owing to the vehicle 439d is an unobservable area 221, as illustrated in FIG. 5.

Under the situation illustrated in FIG. 5, the first extractor 402 extracts the vehicles 439a and 439d as the first dynamic information. The first extractor 402 also extracts the unobservable areas 220 and 221. Since the vehicles 439b and 439c are included in the unobservable area 220, and the vehicle 439e is included in the unobservable area 221, the first sensor 411 cannot observe the vehicles 439b, 439c, and 439e. The dynamic map is a map in which areas on a static map are associated with dynamic information indicating objects that exist at actual places corresponding to the areas, as described above, but if an actual place in question is an unobservable area, then the vehicle that performs control for safety by using the dynamic map does not know whether or not another vehicle, a person, or the like exists at the place, and thus it is necessary to stop temporarily or drive slowly even when another vehicle, a person, or the like does not actually exist in the unobservable area. Thus, in order for the vehicle and so on to move more safely and smoothly by using the dynamic map, it is necessary to minimize the unobservable area.

For example, the first extractor 402 constructs a whole dynamic map in which the extracted first dynamic information and unobservable-area information indicating the unobservable areas 220 and 221 are superimposed on the static map 440 stored in the storage unit 403 and stores the whole dynamic map in the storage unit 403.

Next, the second communicator 401 transmits the unobservable-area information indicating the unobservable areas 220 and 221, extracted by the first extractor 402, to at least one moving terminal 439 (step S23). More specifically, the second communicator 401 transmits the whole dynamic map including the unobservable-area information to the at least one moving terminal 439. Also, the second communicator 401 transmits the whole dynamic map to the at least one moving terminal 439 via the first communicator 410. More specifically, the first communicator 410 transfers the whole dynamic map, received from the second communicator 401, to the at least one moving terminal 439 by broadcasting the whole dynamic map. The first communicator 410 does not necessarily have to broadcast the whole dynamic map, and may transfer the whole dynamic map to each of the at least one moving terminals 439 by individually establishing a communication connection therewith.

For example, when the first detection data is transmitted from the roadside device 419 at predetermined time intervals, the sensor integration server 400 repeatedly performs the processes in steps S21 to S23 at the predetermined time intervals. The predetermined time is, for example, 100 ms.

Next, an operation when each moving terminal 439 performs sensing using the second sensor 431 will be described with reference to FIGS. 6 and 7.

Figure 6:
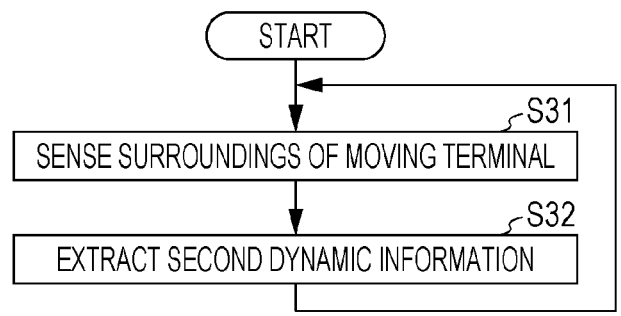
FIG. 6 is a flowchart illustrating one example of an operation when a moving terminal according to the first embodiment performs sensing.

FIG. 6 is a flowchart illustrating one example of an operation when the moving terminal 439 according to the first embodiment performs sensing.

Figure 7:
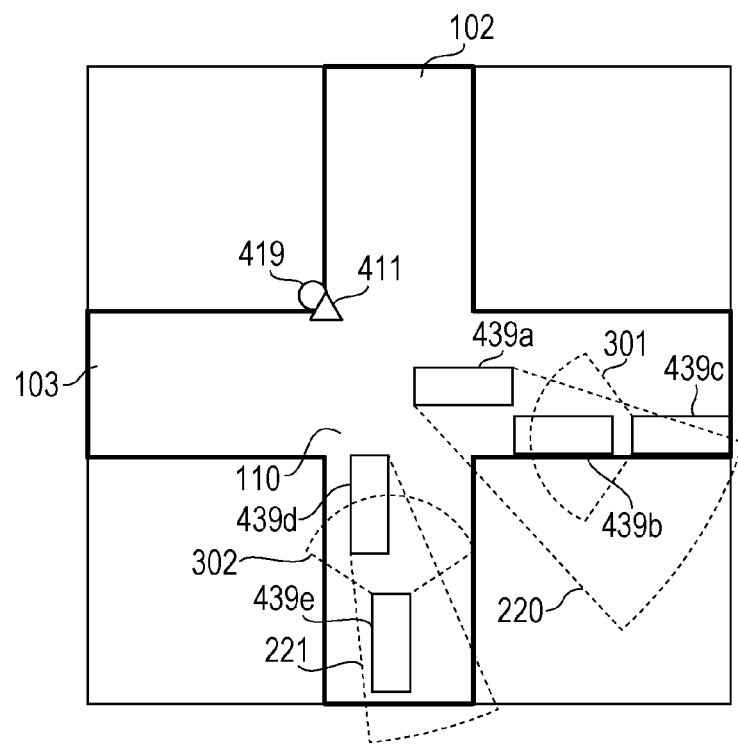
FIG. 7 is a diagram illustrating one example of a sensing range of a second sensor according to the first embodiment.

FIG. 7 is a diagram illustrating one example of a sensing range of the second sensor 431 according to the first embodiment.

First, the second sensor 431 senses surroundings of the moving terminal 439 (step S31). FIG. 7 illustrates a sensing range 301 of the second sensor 431 included in the vehicle 439c and a sensing range 302 of the second sensor 431 included in the vehicle 439e. Sensing ranges of the second sensors 431 included in the vehicles 439a, 439b, and 439d are not illustrated in FIG. 7. Each moving terminal 439 has, for example, a plurality of sensors, and in the present embodiment, a sensor that is included in the plurality of sensors and that senses an area in the traveling direction of the moving terminal 439 is the second sensor 431. FIG. 7 further illustrates the unobservable areas 220 and 221. The sensor integration server 400 can reduce the unobservable area 220 through collection of sensing information in the sensing range 301 of the vehicle 439b. The sensor integration server 400 can also reduce the unobservable area 221 through collection of sensing information in the sensing range 302 of the vehicle 439e.

The description below will be given while paying attention to the vehicle 439c, which is one moving terminal 439. The second sensor 431, which is a laser rangefinder, emits laser light, such as infrared laser light, to the sensing range 301 illustrated in FIG. 7. The second sensor 431 has, for example, a mechanism for horizontally rotating the second sensor 431 about the front end of the moving terminal 439 in the traveling direction. This makes it possible to perform laser scanning in the sensing range 301. As described above, the second sensor 431 obtains the second detection data for recognizing the presence of an object, such as a vehicle, person, or bicycle, that exists on the roads 102 and 103. The second detection data is, for example, point-group data indicating points on an object illuminated with laser light when the second sensor 431 performs laser-scanning in the sensing range 301. Each piece of point data has, for example, information regarding a distance and a direction from the second sensor 431, when centered at the second sensor 431, in the sensing range 301, and information regarding coordinates indicating a height and so on. Thus, since the vehicle 439b exists in the sensing range 301, as illustrated in FIG. 7, the second sensor 431 obtains point-group data on the vehicle 439b as the second detection data, the point cloud data being used for recognizing the position where the vehicle 439b exists.

Next, based on the second detection data in the sensing range 301 of the second sensor 431, the second detection data being obtained by the second sensor 431, the second extractor 432 extracts second dynamic information indicating objects that exist in the sensing range 301 of the second sensor 431 (step S32). The second extractor 432 recognizes what objects exist, for example, by applying machine learning to the second detection data obtained by the second sensor 431 and extracts, as the second dynamic information, the recognized objects that exist in the sensing range 301.

For example, the second extractor 432 constructs an individual dynamic map in which the extracted second dynamic information and observation-area information indicating the sensing range 301 of the second sensor 431 are superimposed on the static map 440 stored in the storage unit 433, and stores the individual dynamic map in the storage unit 433. It is assumed that, for example, the moving terminal 439 has a global positioning system (GPS) and recognizes the coordinates of the moving terminal 439 (the second sensor 431) on the static map 440. Thus, the coordinates centered at the second sensor 431 can be converted into coordinates on the static map 440, and the positions of respective points in the second detection data can be mapped to the static map 440. That is, the second dynamic information can be mapped to the static map 440. Also, for example, it is assumed that the moving terminal 439 recognizes a position, a size, and so on in the sensing range 301 of the second sensor 431 relative to the second sensor 431. Accordingly, the moving terminal 439 can map the observation-area information to the static map 440.

Since the positions of objects that exist on the roads 102 and 103 change by the moment, the moving terminal 439 repeatedly performs the processes in steps S31 and S32 at predetermined time intervals, similarly to the roadside device 419. For example, when 100 ms is taken until the laser scanning in the sensing range 301 is completed in step S31, the second dynamic information is extracted at intervals of 100 ms. In such a manner, the above-described processes are repeated at predetermined time intervals according to hardware specifications of the second sensor 431.

Also, the moving terminal 439 performs an operation for receiving the whole dynamic map including the unobservable-area information from the sensor integration server 400, in parallel with the operation for performing sensing using the second sensor 431. That is, the moving terminal 439 waits for receiving the whole dynamic map, while performing sensing using the second sensor 431. Now, an operation when the moving terminal 439 receives the whole dynamic map from the sensor integration server 400 will be described with reference to FIG. 8.

Figure 8:
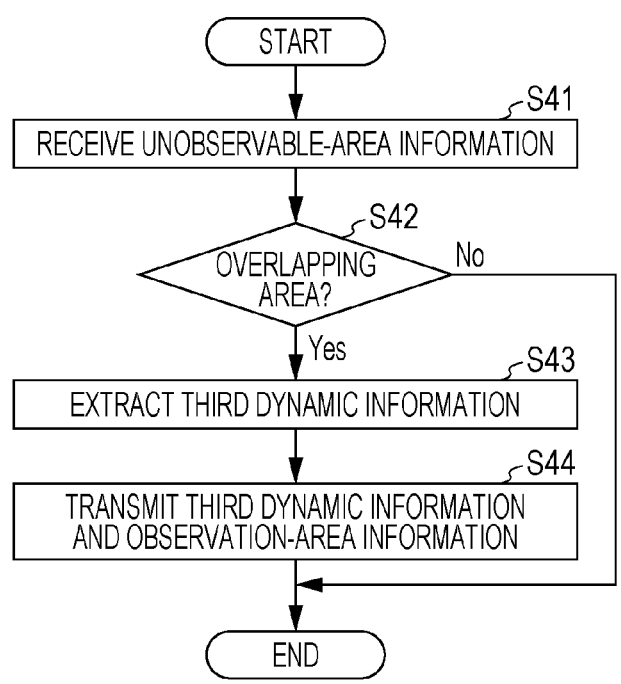
FIG. 8 is a flowchart illustrating one example of an operation when the moving terminal according to the first embodiment receives unobservable-area information.

FIG. 8 is a flowchart illustrating one example of an operation when the moving terminal 439 according to the first embodiment receives the whole dynamic map.

First, the third communicator 430 receives the whole dynamic map transmitted by the second communicator 401 (step S41). Specifically, the third communicator 430 receives the whole dynamic map, transmitted by the second communicator 401, via the first communicator 410.

Next, the controller 434 compares the whole dynamic map received by the third communicator 430 with the individual dynamic map stored in the storage unit 433 and determines whether or not an overlapping area where the unobservable area 220 indicated by the unobservable-area information included in the whole dynamic map and the sensing range 301 of the second sensor 431 indicated by the observation-area information included in the individual dynamic map overlap each other exists (step S42). Since the static map 440 stored in the storage unit 403 and the static map 440 stored in the storage unit 433 are the same, the controller 434 can perform comparison between the whole dynamic map and the individual dynamic that are based on the respective static maps 440. A specific example of determination processing performed by the controller 434 will be described with reference to FIGS. 9 to 11.

Figure 9:
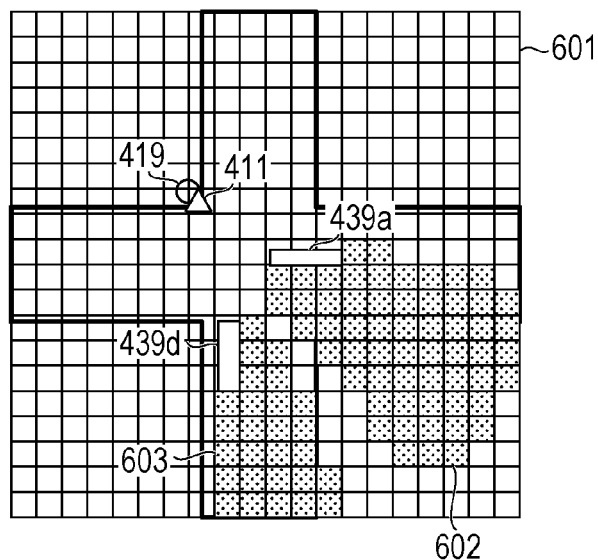
FIG. 9 is a diagram illustrating one example of a whole dynamic map.

FIG. 9 is a diagram illustrating one example of the whole dynamic map.

Figure 10:
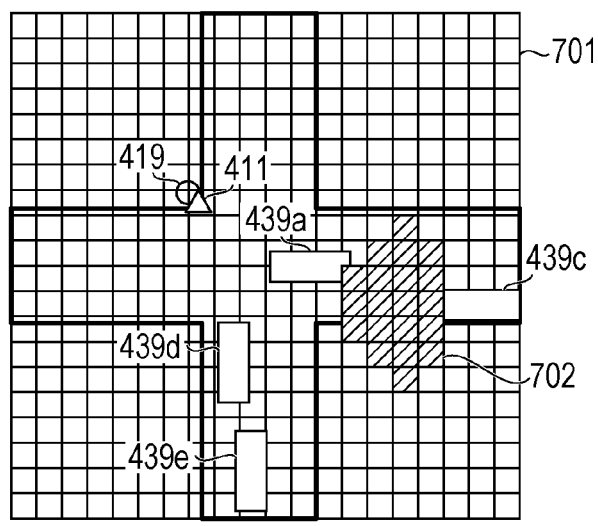
FIG. 10 is a diagram illustrating one example of an individual dynamic map.

FIG. 10 is a diagram illustrating one example of the individual dynamic map.

Figure 11:
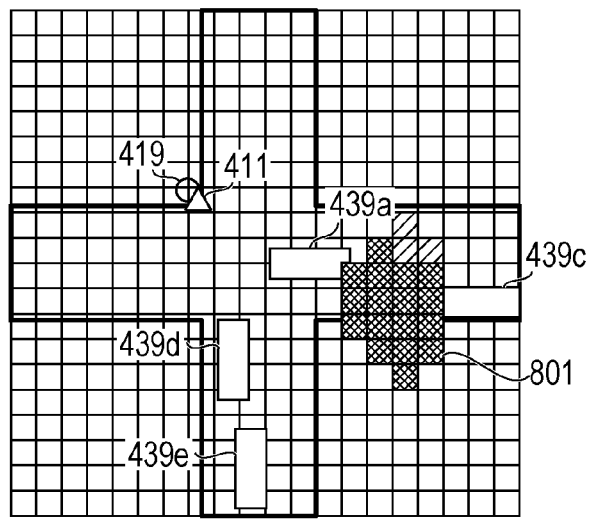
FIG. 11 is a diagram illustrating one example of overlapping-area information.

FIG. 11 is a diagram illustrating one example of overlapping-area information. FIGS. 9 to 11 illustrate the roadside device 419, the first sensor 411, and the moving terminals 439, for ease of understanding the positions of the unobservable-area information, the observation-area information, and overlapping-area information.

As illustrated in FIGS. 9 and 10, the whole dynamic map and the individual dynamic map are each managed as, for example, information obtained by dividing the map into cells of a lattice. Cell groups 602 and 603 illustrated in FIG. 9 are examples of the unobservable-area information. Also, cell groups 701 and 702 illustrated in FIG. 10 are examples of the observation-area information. Each of the maps may be managed as information obtained by dividing the map into cells of a lattice, may be managed as vector information, or may be managed as polygon data.

As the size of each of the cells obtained by dividing the whole dynamic map and the individual dynamic map into the cells decreases, information on these maps is more refined, but the amount of data increases. On the other hand, as the size of each of the cells increases, the amount of data on the maps decreases, but the information on the maps becomes coarser. Accordingly, it is desirable that the size of each of the cells be minimized in a range in which the maps or information included in the maps can be transmitted/received in a wireless network between the first communicator 410 and the third communicator 430.

The description below will also be given while paying attention to the vehicle 439c, which is one moving terminal 439. For example, in the whole dynamic map divided into the cells of the lattice illustrated in FIG. 9, the controller 434 associates "1" with each of the cells of the cell groups 602 and 603 corresponding to the unobservable areas 220 and 221. In addition, the controller 434 associates "0" with each of the cells of a cell group 601 corresponding to an area except the unobservable areas 220 and 221, that is, an area that the first sensor 411 successfully observed. On the other hand, in the individual dynamic map divided into the cells of the lattice illustrated in FIG. 10, the controller 434 associates "1" with each of the cells of the cell group 702 corresponding to the sensing range 301 of the second sensor 431. In addition, the controller 434 associates "0" with each of the cells of the cell group 701 corresponding to an area except the sensing range 301, that is, an area that the second sensor 431 failed to observe. When logical AND of the values of the corresponding cells where the coordinates of the whole dynamic map are the same as the coordinates of the individual dynamic map is "1", the controller 434 determines that an overlapping area exists, and when the value is "0", the controller 434 determines that no overlapping area exists. FIG. 11 illustrates a cell group 801, which is one example of overlapping-area information indicating an overlapping area where the unobservable area 220 and the sensing range 301 overlap each other.

Upon determining that an overlapping area where the unobservable area 220 and the sensing range 301 of the second sensor 431 overlap each other exists (Yes in step S42), the controller 434 extracts third dynamic information that is included in the second dynamic information extracted by the second extractor 432 and that indicates an object that exists in the overlapping area (i.e., an area corresponding to cells where the logical AND is "1") (step S43). Specifically, the controller 434 reads the third dynamic information from the second dynamic information included in the individual dynamic map stored in the storage unit 433. More specifically, the controller 434 extracts the third dynamic information indicating, of objects that exist in the sensing range 301 corresponding to the cell group 702, an object that exists in an overlapping area corresponding to the cell group 801 that is included the range of the cell group 702 and that is smaller than the cell group 702. Thus, since the third dynamic information does not include information indicating an object that exists in the area included in the sensing range 301 and excluding the overlapping area, the amount of the third dynamic information does not exceed the amount of the second dynamic information.

The third communicator 430 then transmits the third dynamic information and the observation-area information to the sensor integration server 400 (step S44). Specifically, the third communicator 430 transmits the third dynamic information and the observation-area information to the sensor integration server 400 via the first communicator 410 (the roadside device 419). As described above, when an overlapping area exists, that is, when the sensor integration server 400 does not recognize part of the dynamic information in the sensing range 301 of the second sensor 431, the moving terminal 439 transmits the third dynamic information corresponding to the part of the dynamic information to the sensor integration server 400. This reduces the amount of information in communication between the sensor integration server 400 and the moving terminal 439, thus making it possible to suppress a shortage of the network band. When the roadside device 419 relays a communication between the sensor integration server 400 and the moving terminal 439, the amount of information in communication between the roadside device 419 and the moving terminal 439 also decreases, and thus a shortage of the network band can be suppressed.

Also, since the observation-area information is transmitted, the sensor integration server 400 can recognize that no object exists in an area that is included in the overlapping area and that is not the area in which the object indicated by the third dynamic information exists. If no third dynamic information exists, that is, no object exists in the overlapping area, in step S43, the third communicator 430 transmits only the observation-area information of the third dynamic information and the observation-area information to the sensor integration server 400. Thus, upon receiving only the observation-area information of the third dynamic information and the observation-area information, the sensor integration server 400 can recognize that no object exists in the overlapping area. Since the observation-area information is transmitted, as described above, it is possible to further reduce the unobservable area.

On the other hand, upon determining that an overlapping area where the unobservable area 220 and the sensing range 301 of the second sensor 431 overlap each other does not exist (No in step S42), the controller 434 does not transmit the third dynamic information and the observation-area information to the sensor integration server 400. Thus, when no overlapping area exists, that is, when the sensor integration server 400 already recognizes dynamic information in the sensing range 301 of the second sensor 431, neither the third dynamic information and the observation-area information nor the second dynamic information are transmitted from the moving terminal 439 to the sensor integration server 400. Accordingly, when the moving terminal 439 is adapted not to transmit those pieces of information, it is possible to suppress all of the moving terminals 439 transmitting the second dynamic information, and it is also possible to suppress a shortage of the network band.

For example, when the whole dynamic map including the unobservable-area information is transmitted from the sensor integration server 400 (the roadside device 419) at predetermined time intervals, the moving terminal 439 repeatedly performs the processes in steps S41 to S44 at the predetermined time intervals.

The third dynamic information may also include information indicating the presence of the host vehicle, that is, the vehicle 439c.

Next, an operation when the sensor integration server 400 receives the third dynamic information and the observation-area information from the moving terminal 439 and constructs an integrated dynamic map will be described with reference to FIG. 12.

Figure 12:
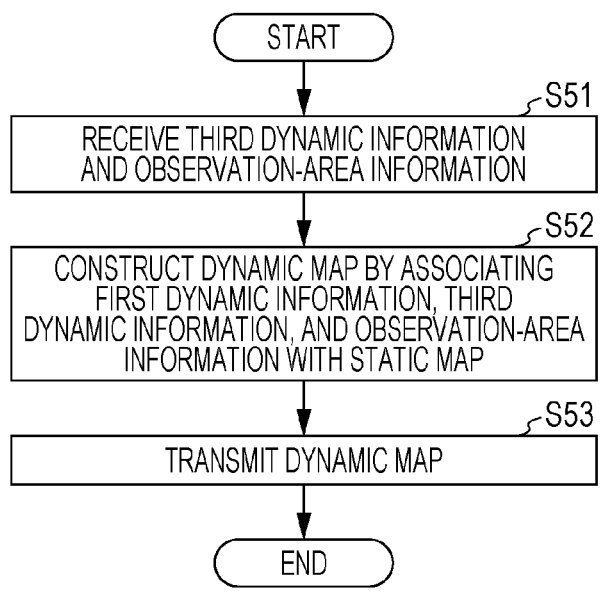
FIG. 12 is a flowchart illustrating one example of an operation when the sensor integration server according to the first embodiment constructs an integrated dynamic map.

FIG. 12 is a flowchart illustrating one example of an operation when the sensor integration server 400 according to the first embodiment constructs an integrated dynamic map.

The second communicator 401 receives the third dynamic information and observation-area information transmitted by the third communicator 430 (step S51). More specifically, the second communicator 401 receives the third dynamic information and observation-area information, transmitted by the third communicator 430, via the first communicator 410 (the roadside device 419). Since the sensor integration server 400 transmits the whole dynamic map to one or more moving terminals 439, as described in step S23 in FIG. 4, there is a possibility that the third dynamic information and the observation-area information are transmitted from each of the moving terminals 439. Accordingly, the sensor integration server 400 may wait for receiving the third dynamic information and the observation-area information of each of the moving terminals 439 for a certain amount of time. The certain amount of time may be pre-defined fixed amount of time. The certain amount of time may also be, for example, an estimated time taken from when the sensor integration server 400 transmits the whole dynamic map to one or more moving terminals 439 until the third dynamic information and the observation-area information are transmitted to the sensor integration server 400. That is, the certain amount of time may be a time based on a round-trip delay time in a network between the sensor integration server 400 and the moving terminal 439. When the sensor integration server 400 can recognize the number of moving terminals 439 that exist in the surroundings of the roadside device 419, the certain amount of time may be a time based on the number of moving terminals 439.

Next, the dynamic-map constructor 404 constructs an integrated dynamic map in which the first dynamic information extracted by the first extractor 402 and the third dynamic information and observation-area information received by the second communicator 401 are associated with the static map 440 (step S52). Specifically, the dynamic-map constructor 404 reads the whole dynamic map stored in the storage unit 403, the first dynamic information being already superimposed on the whole dynamic map. The dynamic-map constructor 404 superimposes the third dynamic information and observation-area information, received by the second communicator 401, on the whole dynamic map to thereby construct an integrated dynamic map.

Subsequently, the second communicator 401 transmits the integrated dynamic map, constructed by the dynamic-map constructor 404, to the at least one moving terminal 439 (step S53). Specifically, the second communicator 401 transmits the integrated dynamic map, constructed by the dynamic-map constructor 404, to the at least one moving terminal 439 via the first communicator 410 (the roadside device 419). More specifically, by broadcasting the integrated dynamic map received from the second communicator 401, the first communicator 410 (the roadside device 419) transfers the integrated dynamic map to the at least one moving terminal 439.

The moving terminal 439 that has received the integrated dynamic map performs processing using the integrated dynamic map. Based on the received integrated dynamic map, the dynamic-map processor 435 controls actions of the moving terminal 439. For example, the moving terminal 439 that is moving stops, upon recognizing that a vehicle, person, or the like exists in a blind spot in the traveling direction of the moving terminal 439 by using the integrated dynamic map, or continues moving without stopping, upon recognizing that no vehicle, person, or the like exists in the blind spot. In order to receive an integrated dynamic map corresponding to the surrounding situation that changes by the moment, the moving terminal 439 waits for receiving the integrated dynamic map after the control performed by the dynamic-map processor 435 finishes.

Since information about an area that is included in information about an area the roadside device 419 failed to observe and that overlaps an area observed by the moving terminal 439 is selectively transmitted, as described above, a band used in a wireless network, for example, between the roadside device 419 and the moving terminal 439 can be reduced, and stable communication can be realized.

Second Embodiment

A second embodiment will be described with reference to FIGS. 13 to 16.

First, the configuration of a dynamic-map constructing system 2 according to the second embodiment will be described with reference to FIG. 13.

Figure 13:
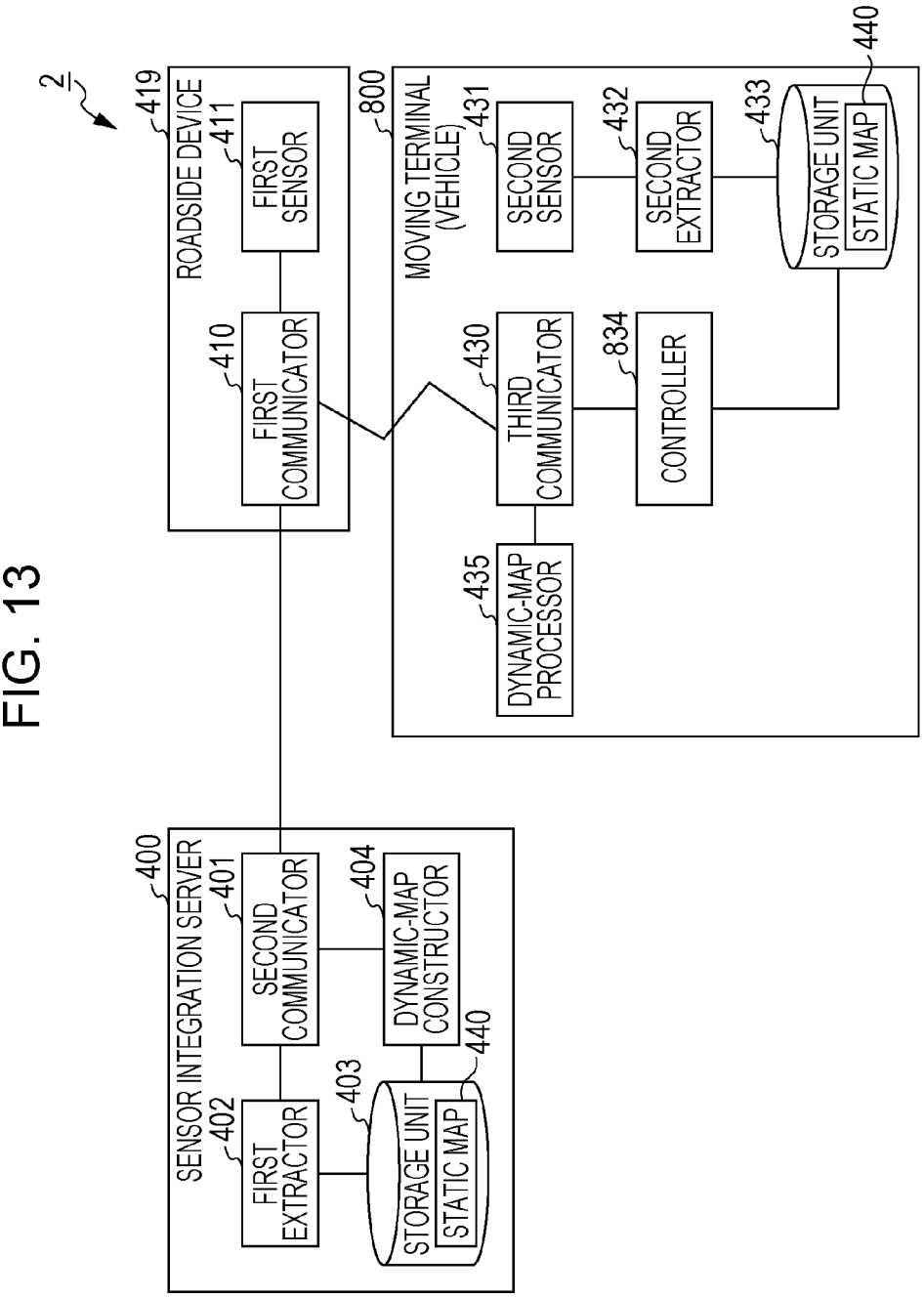
FIG. 13 is a block diagram illustrating one example of the configuration of a dynamic-map constructing system according to a second embodiment.

FIG. 13 is a block diagram illustrating one example of the configuration of the dynamic-map constructing system 2 according to the second embodiment.

The dynamic-map constructing system 2 according to the present embodiment differs from the dynamic-map constructing system 1 according to the first embodiment in that a moving terminal 800 is provided instead of the moving terminal 439. Since other constituent elements of the dynamic-map constructing system 2 are substantially the same as those in the first embodiment, descriptions thereof are not given hereinafter. In addition, the moving terminal 800 differs from the moving terminal 439 according to the first embodiment in that a controller 834 is provided instead of the controller 434. Since other constituent elements of the moving terminal 800 are substantially the same as those in the first embodiment, descriptions thereof are not given hereinafter.

Similarly to the controller 434 according to the first embodiment, the controller 834 determines whether or not an overlapping area where the unobservable area indicated by the unobservable-area information received by the third communicator 430 and the sensing range of the second sensor 431 overlap each other exists. The controller 834 also performs an operation corresponding to the second dynamic information extracted by the second extractor 432. The operation of the controller 834 will be described with reference to FIG. 14.

Figure 14:
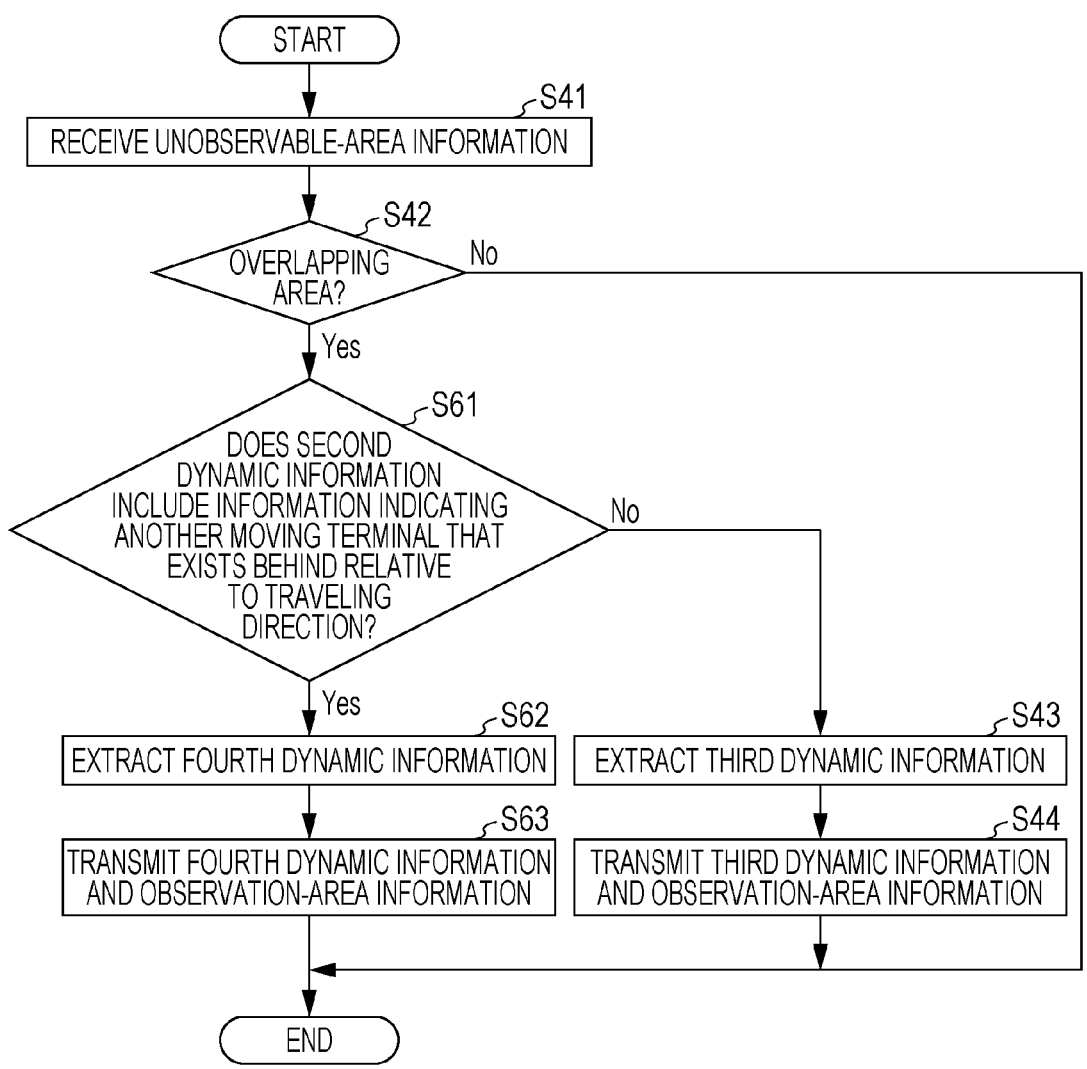
FIG. 14 is a flowchart illustrating one example of an operation when a moving terminal according to the second embodiment receives unobservable-area information.

FIG. 14 is a flowchart illustrating one example of an operation when the moving terminal 800 according to the second embodiment receives the unobservable-area information. Since processes in steps S41 to S44 are substantially the same as those in FIG. 8, descriptions thereof are not given hereinafter.

Upon determining that an overlapping area where the unobservable area and the sensing range of the second sensor 431 overlap each other exists (Yes in step S42), the controller 834 determines whether or not the second dynamic information includes information indicating another moving terminal 800 that exists behind relative to the traveling direction of the moving terminal 800 (step S61). Specifically, the controller 834 reads the second dynamic information included in the individual dynamic map stored in the storage unit 433. In this case, since the second extractor 432 recognizes what objects exist in the sensing range of the second sensor 431 through machine learning or the like, as described above, it is possible to determine whether or not the second dynamic information includes information indicating the other moving terminal 800. A specific situation in which the determination in step S61 is made will now be described with reference to FIG. 15.

FIG. 15 is a diagram illustrating the sensing range of the second sensor 431 according to the second embodiment.

In FIG. 15, vehicles 800a to 800c that are traveling in the vicinity of the intersection 110 are depicted as a situation of the roads 102 and 103 in the vicinity of the intersection 110 at a moment. In the present embodiment, the vehicles 800a to 800c may be collectively referred to as "moving terminals 800". Also, the direction from right to left in FIG. 15 is the traveling direction of the moving terminals 800.

FIG. 15 illustrates a sensing range 1001 of the second sensor 431 included in the vehicle 800b and a sensing range 1002 of the second sensor 431 included in the vehicle 800c. The sensing range of the second sensor 431 included in the vehicle 800a is not illustrated in FIG. 15. Each moving terminal 800 has, for example, a plurality of sensors, and in the present embodiment, a sensor that is included in the plurality of sensors and that senses, for example, 360° surroundings of the moving terminal 800 is the second sensor 431. Also, FIG. 15 illustrates an unobservable area 220 that is a blind spot of the first sensor 411 owing to the vehicle 800a. In the present embodiment, the sensor integration server 400 can also reduce the unobservable area 220 through collection of sensing information in the sensing range 1001 of the vehicle 800b and the sensing range 1002 of the vehicle 800c. The description below will be given while paying attention to the vehicle 800b, which is one moving terminal 800. The description below will also be given based on the premise that the vehicle 800c behind the vehicle 800b has the same functions as those of the moving terminal 800.

Under such a situation, the controller 834 in the vehicle 800b determines that an overlapping area where the unobservable area 220 and the sensing range 1001 of the second sensor 431 overlap each other exists. Thus, by using the second sensor 431, the vehicle 800b can know that another vehicle 800c exists behind relative to the traveling direction of the vehicle 800b. Thus, the controller 834 determines that the second dynamic information includes information indicating the other vehicle 800c that exists behind relative to the traveling direction the vehicle 800b (Yes in step S61).

Next, the controller 834 in the vehicle 800b extracts the third dynamic information and further extracts fourth dynamic information that is included in the third dynamic information and that indicates an object that exists ahead relative to the traveling direction of the vehicle 800b (step S62). More specifically, the controller 834 reads the third dynamic information from the second dynamic information included in the individual dynamic map stored in the storage unit 433 and further reads the fourth dynamic information included in the third dynamic information. The fourth dynamic information will now be described with reference to FIG. 16.

FIG. 16 is a diagram for describing the fourth dynamic information.

The vehicle 800b presumes that the sensing range 1002 of the second sensor 431 included in the vehicle 800c behind the vehicle 800b includes an area that is included in the sensing range 1001 of the second sensor 431 included in the vehicle 800b and that lies behind relative to the traveling direction of the traveling direction of the vehicle 800b. Accordingly, the vehicle 800b presumes that the vehicle 800c transmits, to the sensor integration server 400, dynamic information indicating an object that exists in that area that lies behind relative to the traveling direction of the traveling direction of the vehicle 800b, and thus the controller 834 extracts the fourth dynamic information that is included in the third dynamic information and that indicates an object that exists ahead relative to the traveling direction of the vehicle 800b. The fourth dynamic information is, specifically, dynamic information indicating an object that exists in a sensing range 1011 that is included in the sensing range 1001 and that lies ahead in the traveling direction, as illustrated in FIG. 16. When the vehicle 800b knows that the vehicle 800c exists behind the vehicle 800b under the premise that the vehicle 800c has the same functions as those of the vehicle 800b, the vehicle 800c knows that the vehicle 800b exists ahead of the vehicle 800c. Thus, when the vehicle 800b exists in an unobservable area, the vehicle 800c transmits information indicating the presence of the vehicle 800b to the sensor integration server 400. Hence, the vehicle 800b does not include, in the fourth dynamic information, dynamic information indicating the presence of the vehicle 800b.

The third communicator 430 then transmits the fourth dynamic information and the observation-area information to the sensor integration server 400 (step S63). More specifically, the third communicator 430 transmits the fourth dynamic information and the observation-area information to the sensor integration server 400 via the first communicator 410.

On the other hand, upon determining that the second dynamic information does not include information indicating another vehicle 800c that exists behind relative to the traveling direction of the vehicle 800b (No in step S61), the controller 834 performs the processes in steps S43 and S44, as in the first embodiment.

When an area where the sensing ranges of the second sensors 431 included in the moving terminals 800 overlap each other exists, as described above, and each of the moving terminals 800 transmits information found in the overlapping area, pieces of dynamic information that are identical to each other are transmitted, thus consuming the network band. In contrast, in the present embodiment, when the vehicle 800b recognizes that another vehicle 800c exists behind relative to the traveling direction of the vehicle 800b, the vehicle 800b transmits, to the sensor integration server 400, the fourth dynamic information indicating an object that exists ahead in the traveling direction of the vehicle 800b, in order to prevent the plurality of moving terminals 800 from transmitting pieces of information that are identical to each other. Accordingly, pieces of information that are identical to each other are less likely to be transmitted, thus making it possible to further suppress a shortage of the network band.

As described above, when a rear side of an area observed by one moving terminal 800 overlaps a front side of an area observed by another moving terminal 800, and for example, the other moving terminal 800 transmits the dynamic information included in the overlapping area, for example, it is possible to reduce the band used in a wireless network between the roadside device 419 and the moving terminals 800, thereby making it possible to realize stable communication.

Third Embodiment

A third embodiment will be described with reference to FIGS. 17 to 19.

First, the configuration of a dynamic-map constructing system 3 according to the third embodiment will be described with reference to FIG. 17.

Figure 17:
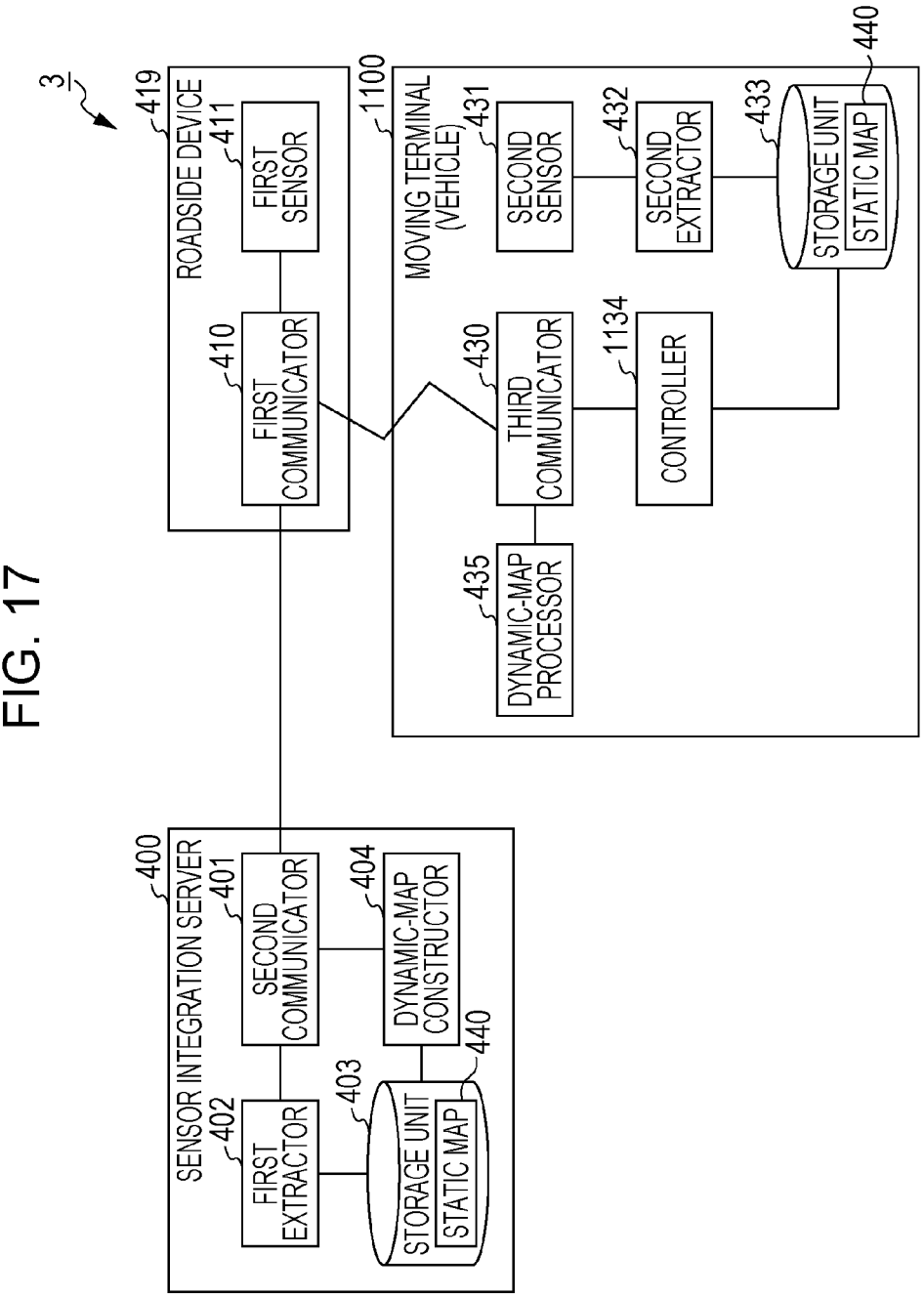
FIG. 17 is a block diagram illustrating one example of the configuration of a dynamic-map constructing system according to a third embodiment.

FIG. 17 is a block diagram illustrating one example of the configuration of the dynamic-map constructing system 3 according to the third embodiment.

The dynamic-map constructing system 3 according to the present embodiment differs from the dynamic-map constructing system 1 according to the first embodiment in that a moving terminal 1100 is provided instead of the moving terminal 439. Since other constituent elements of the dynamic-map constructing system 3 are substantially the same as those in the first embodiment, descriptions thereof are not given hereinafter. In addition, the moving terminal 1100 differs from the moving terminal 439 according to the first embodiment in that a controller 1134 is provided instead of the controller 434. Since other constituent elements of the moving terminal 1100 are substantially the same as those in the first embodiment, descriptions thereof are not given hereinafter.

Similarly to the controller 434 according to the first embodiment, the controller 1134 determines whether or not an overlapping area where the unobservable area indicated by the unobservable-area information received by the third communicator 430 and the sensing range of the second sensor 431 overlap each other exists. The controller 1134 also performs an operation so as to increase the size of the overlapping area. The operation of the controller 1134 will be described with reference to FIG. 18.

Figure 18:
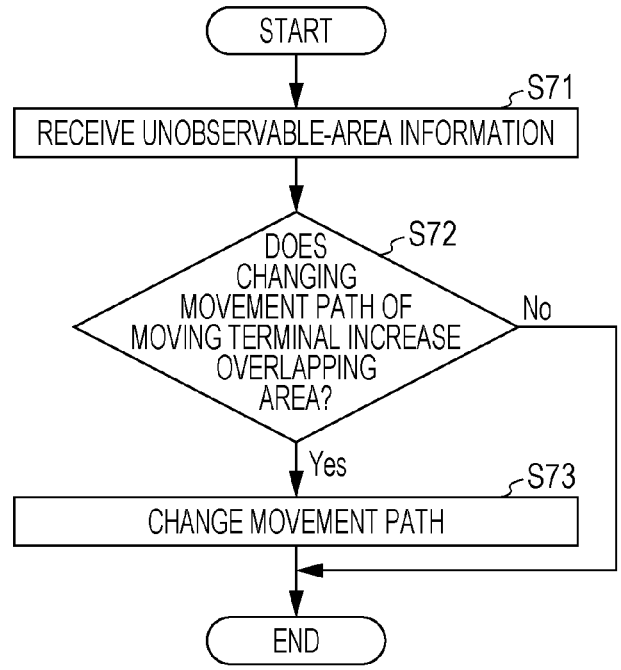
FIG. 18 is a flowchart illustrating one example of an operation when a moving terminal according to the third embodiment makes a determination as to changing the movement path thereof.

FIG. 18 is a flowchart illustrating one example of an operation when the moving terminal 1100 according to the third embodiment makes a determination as to changing the movement path thereof.

First, the third communicator 430 receives a whole dynamic map (unobservable-area information) transmitted by the second communicator 401 (step S71).

Next, the controller 1134 determines whether or not changing the movement path of the moving terminal 1100 increases the overlapping area (step S72). Specifically, the controller 1134 checks the size of the current overlapping area. The controller 1134 then determines whether or not changing the movement path increases the current overlapping area. For example, when the moving terminal 1100 is a vehicle, the controller 1134 determines (presumes) whether or not moving in a lane or changing lanes increases the overlapping area.

Upon determining that changing the movement path of the moving terminal 1100 increases the overlapping area (Yes in step S72), the controller 1134 changes the movement path (step S73). When there are a plurality of paths through which the amounts of time taken to arrive at a destination are substantially the same, the controller 1134 may change the movement path to, of the plurality of paths, a path in a direction that differs from the current traveling direction. Now, a specific situation in which the determination in step S72 is made will be described with reference to FIG. 19.

Figure 19:
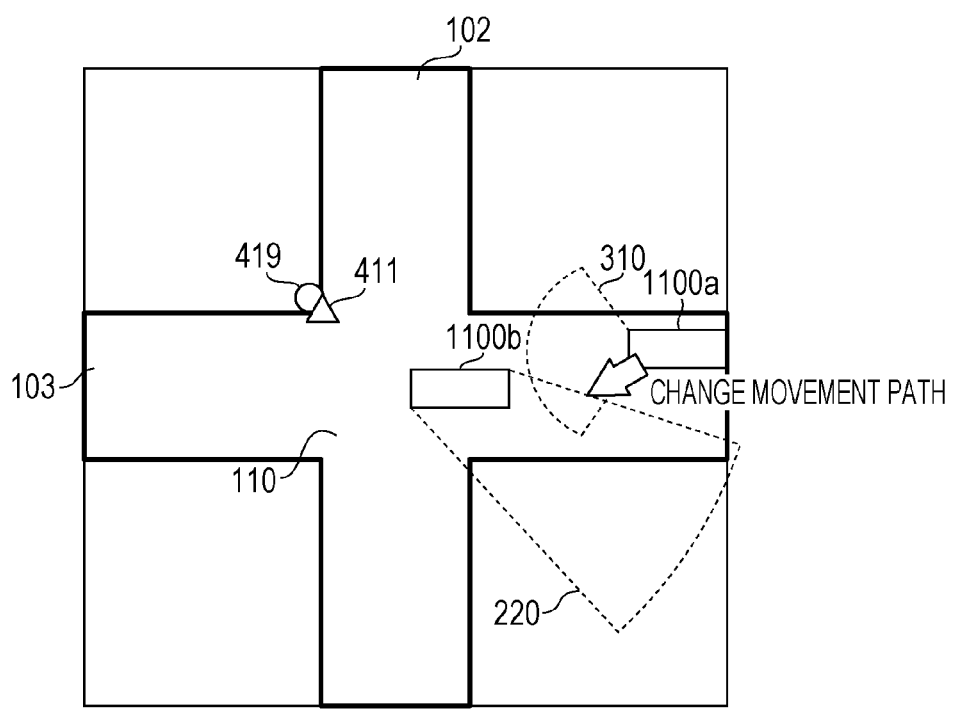
FIG. 19 is a conceptual diagram illustrating that changing a movement path increases an overlapping area.

FIG. 19 is a conceptual diagram illustrating that changing a movement path increases an overlapping area.

In FIG. 19, vehicles 1100a and 1100b that are traveling in the vicinity of the intersection 110 are depicted as a situation of the roads 102 and 103 in the vicinity of the intersection 110 at a moment. In the present embodiment, the vehicles 1100a and 1100b may be collectively referred to as "moving terminals 1100".

FIG. 19 illustrates a sensing range 310 of the second sensor 431 included in the vehicle 1100a. A sensing range of the second sensor 431 included in the vehicle 1100b is not illustrated in FIG. 19. FIG. 19 also illustrates an unobservable area 220. The sensor integration server 400 can reduce the unobservable area 220 through collection of sensing information in the sensing range 310 of the vehicle 1100a. However, the unobservable area 220 and the sensing range 310 only partially overlap each other. The traveling direction of the vehicle 1100a is a direction from right to left in FIG. 19, and the vehicle 1100a is assumed to be in a right lane of the road 103. In this case, the controller 1134 presumes that changing the lane in which the vehicle 1100a is traveling to a left lane of the road 103 increases the overlapping area. Accordingly, the controller 1134 determines that the movement path is to be changed and causes the lane in which the vehicle 1100a is traveling to be changed to the left lane.

On the other hand, upon determining that changing the movement path of the moving terminal 1100 does not increase the overlapping area (No in step S72), the controller 1134 does not change the movement path. For example, at this point in time, when the sensing range 310 is entirely included in the unobservable area 220 or the unobservable area 220 is entirely included in the sensing range 310, the controller 1134 does not change the movement path.

When an overlapping area does not exist or is small in the above-described processing, and it is determined that changing the movement path of the moving terminal 1100 (the vehicle) increases the overlapping area, control for moving the moving terminal 1100 (the vehicle) is performed, thus making it possible to reduce the unobservable area 220.

Other Embodiments

Although the dynamic-map constructing method, the dynamic-map constructing system, and the moving terminal according to the present disclosure have been described above based on particular embodiments, the present disclosure is not limited to the embodiments. Modes obtained by applying various modifications conceived by those skilled in the art to the embodiments or modes constituted by combining the constituent elements in different embodiments are also encompassed by the scope of the present disclosure, as long as such modes do not depart from the spirit of the present disclosure.

For example, although, in the above embodiments, the whole dynamic map including the unobservable-area information is transmitted from the sensor integration server 400 to the moving terminal, the present disclosure is not limited thereto, and only the unobservable-area information may be transmitted without transmission of the whole dynamic map.

Also, for example, although, in the above embodiments, the third dynamic information (or the fourth dynamic information) and the observation-area information are transmitted from the moving terminal to the sensor integration server 400, the present disclosure is not limited thereto, and only the third dynamic information (or the fourth dynamic information) may be transmitted without transmission of the observation-area information.

In addition, for example, although, in the first embodiment, the second sensor 431 is a sensor for sensing an area in the traveling direction of the moving terminal 439, the second sensor 431 is not limited thereto and may be, for example, a sensor for sensing 360 surroundings of the moving terminal 439.

Additionally, for example, in the second embodiment, the sensing range 1011 that is included in the sensing range 1001 and that lies ahead in the traveling direction is a range like that illustrated in FIG. 16, the present disclosure is not limited thereto. For example, the sensing range 1011 does not necessarily have to include, for example, a range in the vicinity of the side of the moving terminal 800 (the vehicle 800b). That is, the sensing range 1011 may be, for example, a range that lies ahead of the front end of the moving terminal 800 (the vehicle 800b).

Also, for example, although, in the second embodiment, the dynamic information to be transmitted to the sensor integration server 400 is determined depending on whether or not another moving terminal 800 exists behind relative to the traveling direction of one moving terminal 800, the present disclosure is not limited thereto. For example, when a large number of moving terminals 800 exist in the sensing range of the second sensor 431 included in a certain moving terminal 800, it can be presumed the large number of moving terminals 800 including the certain moving terminal 800 can successfully observe identical dynamic information. Thus, in this case, for example, each of the large number of moving terminals 800 may randomly determine whether or not the extracted dynamic information is to be transmitted to the sensor integration server 400. Even when one moving terminal 800 does not transmit the dynamic information to the sensor integration server 400, the possibility that any of the other large number of moving terminals 800 transmits dynamic information that is identical to that dynamic information is high.

Also, for example, although, in the above embodiments, the third dynamic information (or the fourth dynamic information) and the observation-area information are transmitted from the moving terminal to the sensor integration server 400, the present disclosure is not limited thereto, and the third dynamic information (or the fourth dynamic information) and the observation-area information do not necessarily have to be transmitted. For example, when it can be determined that another moving terminal that is moving to the overlapping area does not exist, based on the whole dynamic map received by one moving terminal, there is no other moving terminal that requires the third dynamic information in the overlapping area, and thus the third dynamic information does not necessarily have to be transmitted to the sensor integration server 400.

Also, for example, in the second embodiment, the plurality of moving terminals 800 may perform inter-vehicle communication with each other to determine which of the moving terminals 800 is to transmit identical pieces of dynamic information extracted by the individual moving terminals 800, depending on the sensing situations of the individual moving terminals 800.

In the embodiments described above, the individual constituent elements may be constituted by dedicated hardware or may be realized by executing a software program suitable for each constituent element. A program executor, such as a central processing unit (CPU) or a processor, may read and execute a software program recorded in a storage medium, such as a hard disk or a semiconductor memory, to thereby realize the constituent elements.

In the embodiments described above, each constituent element may be a circuit. A plurality of constituent elements may constitute a single circuit as a whole or may constitute respective independent circuits. Each circuit may also be a general-purpose circuit or a dedicated circuit.

In addition, for example, the steps included in the dynamic-map constructing method may be executed by a computer (or a computer system). In the present disclosure, the steps included in the method can be realized as a program to be executed by the computer. In addition, the present disclosure can be realized by a non-transitory computer-readable storage medium, such as a compact disc read-only memory (CD-ROM), on which the program is recorded.

For example, when the present disclosure is realized by a program (software), hardware resources, such as a CPU, a memory, and an input/output circuit in the computer, are utilized to execute the program to thereby execute the steps. That is, the CPU obtains data from the memory, the input/output circuit, or the like, performs a computational operation, and outputs a result of the computational operation to the memory, the input/output circuit, or the like to thereby execute the steps.

In addition, modes obtained by making various modifications conceived by those skilled in the art to the embodiment or modes realized by arbitrarily combining the constituent elements and the functions in the embodiments within a scope that does not depart from the spirit of the present disclosure are also encompassed by the present disclosure.

The present disclosure can be applied to a method for constructing a dynamic map for aiding safe driving and realizing automatic driving and so on, a system using a dynamic map, and a moving terminal using a dynamic map.

What is claimed is:

1. A method used in a system including a roadside device having a first sensor, a moving terminal having a second sensor, and a server, the method comprising:
   obtaining, by the first sensor, first detection data of surroundings of the roadside device, the first detection data being in a sensing range of the first sensor;
   transmitting, by the roadside device, the first detection data to the server;
   receiving, by the server, the first detection data;
   extracting, by the server and from the received first detection data, first dynamic information indicating that a first object exists in the sensing range of the first sensor and an unobservable area that is a blind spot of the first sensor, the blind spot being caused by the first object;
   transmitting, by the server and to the moving terminal, unobservable-area information indicating the unobservable area;
   obtaining, by the second sensor, second detection data of surroundings of the moving terminal, the second detection data being in a sensing range of the second sensor;
   extracting, by the moving terminal and from the second detection data, second dynamic information indicating that a second object exists in the sensing range of the second sensor;
   receiving, by the moving terminal, the unobservable-area information;
   determining, by the moving terminal, whether or not an overlapping area where the unobservable area indicated by the unobservable-area information and the sensing range of the second sensor overlap each other exists;
   transmitting, by the moving terminal, third dynamic information to the server upon determining that the overlapping area exists, the third dynamic information being included in the second dynamic information and indicating an object that exists in the overlapping area; and
   omitting to transmit, by the moving terminal, the second dynamic information to the server upon determining that the overlapping area does not exist.

2. The method according to claim 1, further comprising:
   upon determining that the overlapping area exists, transmitting, by the moving terminal, observation-area information indicating the sensing range of the second sensor to the server.

3. The method according to claim 1, further comprising:
   receiving, by the server, the third dynamic information; and
   constructing, by the server, a dynamic map by associating the extracted first dynamic information and the received third dynamic information with a static map.

4. The method according to claim 1, further comprising:
   when the overlapping area is determined to exist, and the second dynamic information includes information indicating another moving terminal that exists behind relative to a traveling direction of the moving terminal, transmitting, by the moving terminal, fourth dynamic information to the server, the fourth dynamic information being included in the third dynamic information and indicates an object that exists ahead relative to the traveling direction.

5. The method according to claim 1, further comprising:
   when changing a movement path of the moving terminal increases the overlapping area, changing, by the moving terminal, the movement path.

6. A system comprising:
   a moving terminal;
   a roadside device; and
   a server,
   wherein the roadside device includes
      a first sensor that obtains first detection data of surroundings of the roadside device, the first detection data being in a sensing range of the first sensor, and
      a first communicator that transmits the first detection data to the server;
   wherein the server includes
      a second communicator that receives the first detection data, and
      a first extractor that extracts, from the received first detection data, first dynamic information indicating that a first object exists in the sensing range of the first sensor and an unobservable area that is a blind spot of the first sensor, the blind spot being caused by the first object, and
      the server transmits unobservable-area information indicating the extracted unobservable area to the moving terminal; and
   wherein the moving terminal includes
      a third communicator that receives the unobservable-area information,
      a second sensor that obtains second detection data of surroundings of the moving terminal, the second detection data being in a sensing range of the second sensor,
      a second extractor that extracts, from the second detection data, second dynamic information indicating that a second object exists in the sensing range of the second sensor, and
      a controller that determines whether or not an overlapping area where the unobservable area indicated by the received unobservable-area information and the sensing range of the second sensor overlap each other exists,
   wherein, upon determining that the overlapping area exists, the third communicator transmits third dynamic information to the server, the third dynamic information being included in the second dynamic information and indicating an object that exists in the overlapping area, and
   wherein, upon determining that the overlapping area does not exist, the third communicator omits to transmit the second dynamic information to the server.

7. A moving terminal used in a system including the moving terminal, a roadside device having a first sensor that observes surroundings of the roadside device, and a server, the moving terminal comprising:
   a communicator that receives unobservable-area information indicating an unobservable area that is a blind spot of the first sensor, the blind spot being caused by a first object that exists in a sensing range of the first sensor;
   a second sensor that obtains detection data of surroundings of the moving terminal, the detection data being in a sensing range of the second sensor;

an extractor that extracts first dynamic information indicating a second object that exists in a sensing range of the second sensor, based on the detection data of the second sensor; and a controller that determines whether or not an overlapping area where the unobservable area indicated by the unobservable-area information and the sensing range of the second sensor overlap each other exists, wherein, when the controller determines that the overlapping area exists, the communicator transmits second dynamic information to the server, the second dynamic information being included in the first dynamic information extracted by the extractor and indicating an object that exists in the overlapping area, and wherein, when the controller determines that the overlapping area does not exist, the communicator omits to transmit the second dynamic information to the server.

* * * * *